United States Patent
Brown (10) Patent No.: US 11,926,204 B2
(45) Date of Patent: *Mar. 12, 2024

(54) HINGES FOR HARDTOP VEHICLE COVERS

(71) Applicant: Richard A. Brown, Bradenton, FL (US)

(72) Inventor: Richard A. Brown, Bradenton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/514,076

(22) Filed: Oct. 29, 2021

(65) Prior Publication Data

US 2022/0048370 A1 Feb. 17, 2022

Related U.S. Application Data

(63) Continuation-in-part of application No. 16/821,122, filed on Mar. 17, 2020, now Pat. No. 11,192,432.

(51) Int. Cl.
*B60J 7/16* (2006.01)
*B60J 7/14* (2006.01)
*B60J 7/19* (2006.01)

(52) U.S. Cl.
CPC .............. *B60J 7/1642* (2013.01); *B60J 7/146* (2013.01); *B60J 7/1657* (2013.01); *B60J 7/1678* (2013.01); *B60J 7/19* (2013.01); *B60J 7/192* (2013.01); *B60J 7/196* (2013.01)

(58) Field of Classification Search
CPC ...... B60J 7/1642; B60J 7/1657; B60J 7/1678; B60J 7/19; B60J 7/192; B60J 7/196; B60J 7/146
USPC .......................... 296/107.17, 216.03, 220.01
See application file for complete search history.

(56) References Cited

U.S. PATENT DOCUMENTS

| | | | | |
|---|---|---|---|---|
| 1,271,745 A | * | 7/1918 | Muller | B60J 7/053 296/222 |
| 4,161,336 A | * | 7/1979 | LeVan | B60J 7/1642 296/218 |
| 4,805,956 A | * | 2/1989 | Saunders | B60J 7/1657 296/107.17 |
| 5,524,462 A | * | 6/1996 | Loughlin | E05B 67/28 292/307 R |
| 5,833,300 A | * | 11/1998 | Russke | B60J 7/145 296/108 |
| 6,367,852 B1 | * | 4/2002 | Aspenwall | E05C 19/08 292/281 |
| 7,296,832 B1 | * | 11/2007 | Campbell | E05D 11/1007 292/DIG. 17 |
| 7,722,103 B2 | * | 5/2010 | Brandel | B60J 7/148 296/108 |

(Continued)

FOREIGN PATENT DOCUMENTS

| | | | | |
|---|---|---|---|---|
| CA | 2981671 A1 | * | 4/2018 | ............ B60J 10/90 |
| DE | 102004032627 A1 | * | 2/2006 | ............ B60J 7/047 |
| DE | 102007037987 B3 | * | 1/2009 | ............ B60J 7/1642 |

*Primary Examiner* — Amy R Weisberg
*Assistant Examiner* — Dana D Ivey
(74) *Attorney, Agent, or Firm* — Bryan L. Loeffler, Esq.; LOEFFLER IP GROUP, P.A.

(57) ABSTRACT

A set of hinges (1) that allow a user to open and close a set of removable rigid rooftop panels (5, 6) for a vehicle having a hardtop cover, such as a Jeep or sport utility vehicle, without being required to fully remove and store the rigid roof panels. The hinges may be locked in an open position using one or more hasps (24) integrated into the hinges.

1 Claim, 6 Drawing Sheets

(56) References Cited

U.S. PATENT DOCUMENTS

| | | | |
|---|---|---|---|
| 7,823,342 B1* | 11/2010 | Van Horn Steel | E06B 9/02 49/141 |
| 2005/0012357 A1* | 1/2005 | Miller | B60J 7/141 296/107.17 |
| 2006/0028057 A1* | 2/2006 | Kurtz | B60J 7/192 296/218 |
| 2020/0164730 A1* | 5/2020 | Willard | B60J 7/19 |
| 2020/0262280 A1* | 8/2020 | Stickles | B60J 7/1851 |

* cited by examiner

HINGES FOR HARDTOP VEHICLE COVERS

CROSS-REFERENCE TO RELATED APPLICATION

This application is a continuation-in-part of application Ser. No. 16/821,122, filed on Mar. 17, 2020, which is currently pending. The patent application identified above is incorporated herein by reference in its entirety to provide continuity of disclosure.

FIELD OF THE INVENTION

This invention relates to vehicle accessories and more particularly a set of hinges that allow a user to open and close a set of removable roof top panels without being required to fully remove and store the roof panels.

BACKGROUND OF THE INVENTION

Many vehicles, such as Jeeps and other types of sport utility vehicles (SUVs), are sold with various types of tops permitting the vehicles to be driven with fully open, partially open or fully closed. Many designs for rooftops of jeep-type vehicles have been designed in the past. Some of these designs have included bikini-type soft tops and full hard tops. These tops share the same trait of being difficult to remove and/or not providing enough protection in case of a sudden turn in weather, especially with the case of conventional hardtops that must be fully removed and are not transportable when removed.

Newer hardtop designs include removable roof panels that create an open roof between the windshield and a rear roof panel. However, the removable rooftop panels must be fully removed and stored in order to enjoy the open air and this can be a difficult task especially for individuals of a smaller stature. In addition, the removed roof panels leave the interior of the vehicle vulnerable to sudden rain.

Therefore, a need exists for a set of hinges that allow a user to open and close a set of removable roof top vehicle panels without being required to fully remove and store the roof panels.

SUMMARY OF THE INVENTION

The primary object of the present invention is to provide a set of hinges that allow a user to open and close a set of removable rigid rooftop vehicle panels without being required to fully remove and store the rigid roof panels.

An additional object of the present invention is to provide a set of hinges that are adaptable to removable rooftop vehicle panels having curved or offset edges.

An additional object of the present invention is to provide a hard rooftop for a vehicle having panels with integrated hinges.

The present invention fulfills the above and other objects by providing a set of hinges for use on a hardtop for vehicles, such as Jeeps® and SUVs, wherein the hardtop is constructed from three modular pieces that include a base unit and two removable roof panels located above a driver seat and a passenger seat of the vehicle when the two removable roof panels are installed and in closed positions. Normally, removable roof panels would need to be fully removed and stored inside the Vehicle or elsewhere. In contrast, the present invention further provides a set of hinges that attach a rear edge of each removable roof panel to the base unit, thereby allowing the roof panels to be folded up and back over a fixed roof panel of the base unit.

The hinges may be capable of locking in a partially open position to prevent the panels from falling and slamming shut. The locking hinges also aid those who need to open the roof panels using a two-step process. For example, a shorter user may be required to partially raise the roof panels from inside the Vehicle, leave the roof panels in a locked partially raised position, and then exit the Vehicle to finish folding the roof panels back onto the fixed roof panel. One or more latches are preferably located on the fixed roof panel of the base unit to allow the removable roof panels to be locked in an open position for driving. The Hinges may be removable from the removable roof panels and/or the base unit to allow the removable roof panels to still be fully removed from the base unit if desired.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
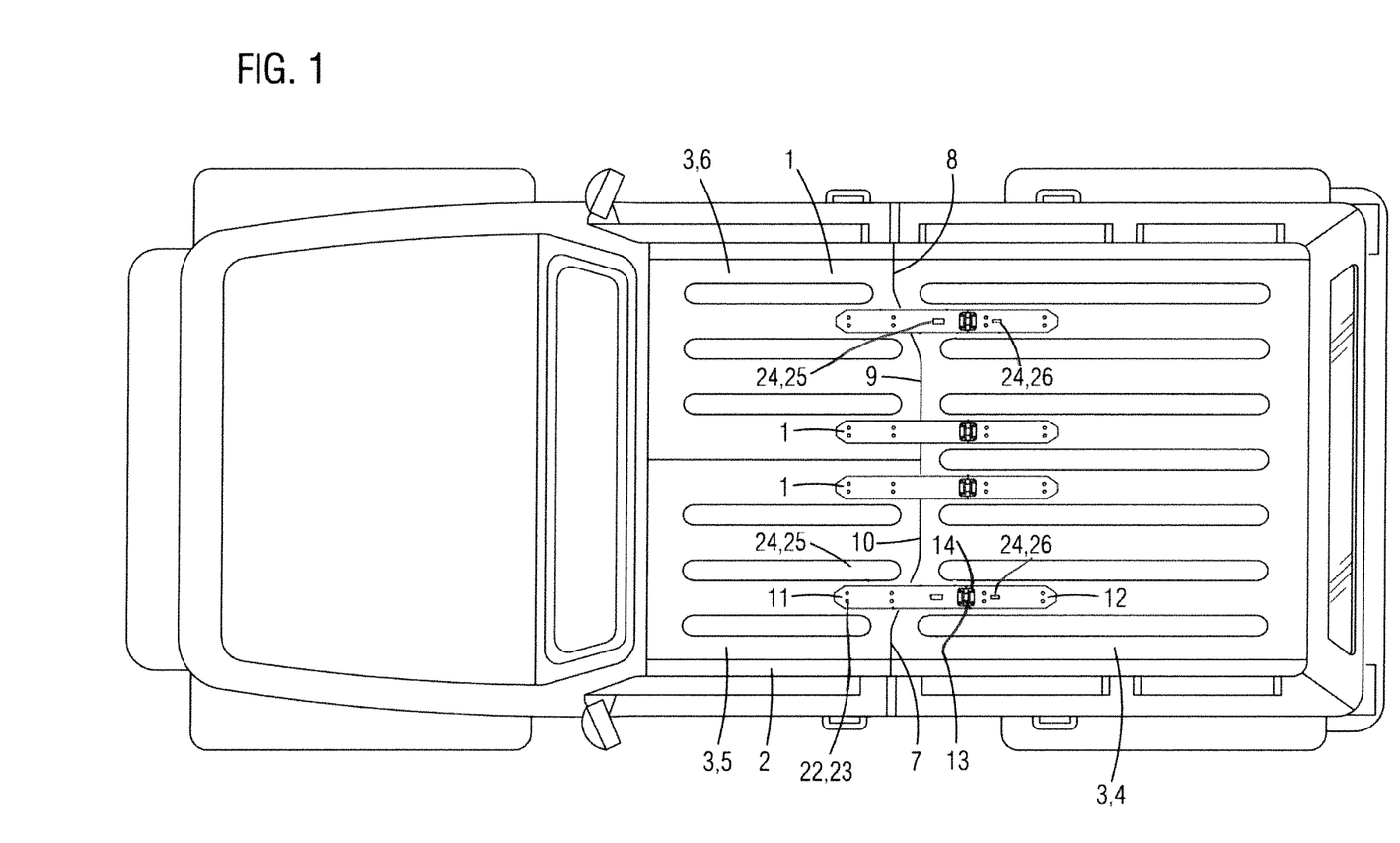
FIG. 1 is a top view of hinges of the present invention on a three-piece modular hardtop for a vehicle wherein the three-piece modular hardtop is in a closed position.

For purposes of describing the preferred embodiment, the terminology used in reference to the numbered accessories in the drawings is as follows:

1. hinge, generally
2. hardtop
3. modular piece
4. base unit
5. driver side roof panel
6. passenger side roof panel
7. rear edge of driver side roof panel
8. rear edge of passenger side roof panel
9. front edge of base unit
10. seam 11. front leaf
12. rear leaf
13. barrel
14. pin
15. locking means
16. latch
17. folding latch
18. base of latch
19. arm
20. rubber pad
21. sliding latch
22. attachment means
23. bolt
24. hasp
25. slot
26. loop
27. cotter pin With reference to FIG. 1, a set of hinges 1 for use on a hardtop 2 for vehicles, such as Jeeps and SUVs, wherein the hardtop 2 is constructed from three modular pieces 3 that include a base unit 4, a driver side roof panel 5 located above a driver seat and a passenger side roof panel 6 located above a passenger seat. Some hardtops 2 may comprise a base unit 4 wherein the driver side roof panel 5 and the passenger side roof panel 6 form a single roof panel. Said driver side roof panel 5 comprises a rear edge 7 that is adjacent to a front edge 9 of the base unit 4. Likewise, said passenger side roof panel 6 comprises a rear edge 8 that is adjacent to a front edge 9 of the base unit 4. The rear edge 7 of the driver side roof panel 6, the rear edge 8 of the passenger side roof panel 6 and the front edge 9 of the base unit 4, respectively, form a seam 10. Said seam 10 may be curved, as illustrated herein. A plurality of hinges 1 attach the driver side roof panel 5 and the passenger side roof panel 6, respectively, to the base unit 4 by spanning the seam 10. The plurality of hinges 1 may be attached to the hardtop 2 via an attachment means 22, such as bolts 23, rivets, welding and so forth.

Each hinge 1 comprises an elongated front leaf 11 attached to an elongated rear leaf 12 by a barrel 13 and pin 14 that allows the font leaf 11 to be rotated in relation to the rear leaf 12. The hinges 1 are secured to the hardtop 2 so the barrels 13 of each hinge 1 are aligned on the same axis. As illustrated in FIG. 1 the seam 10 is curved, thus, at least one of the plurality of hinges 1 comprises a barrel 13 located directly above the seam 10 while at least one of the plurality of hinges 1 comprises a barrel 13 that is offset from the seam 10 and located above the base unit 4, driver side roof panel 5 or passenger side roof panel 6 depending on the curvature of the seam 10.

Figure 9:
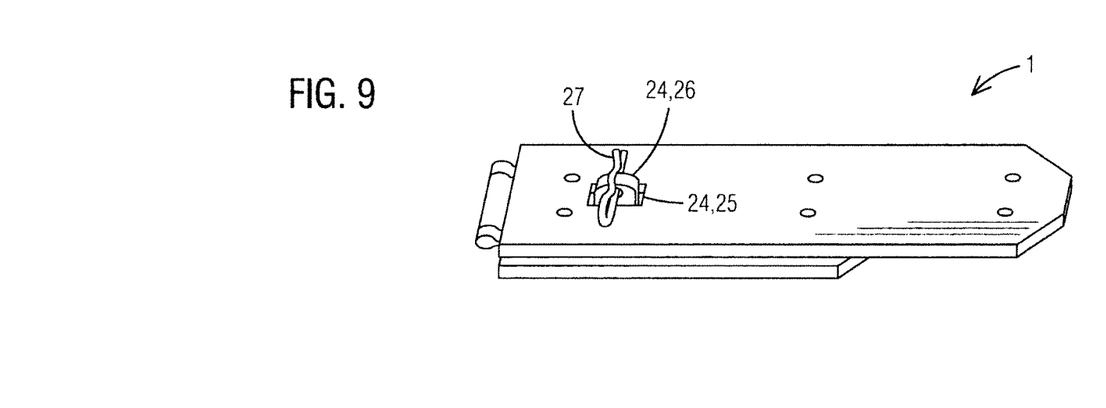
FIG. 9 is a top perspective view of a hinge of the present invention having a hasp integrated therein wherein the hinge is in a folded and locked position.

As further illustrated in FIG. 1, hinges 1 on each of the driver side roof panel 5 and the passenger side roof panel 6 comprise hasps 24 each comprising a slot 25 and corresponding loop 26 that engage each other when the hinges 1 are folded, thereby allowing the folded hinges 1 to be locked into position using cotter pins 27 or equivalent means, as illustrated in FIGS. 9 and 10.

Figure 2:
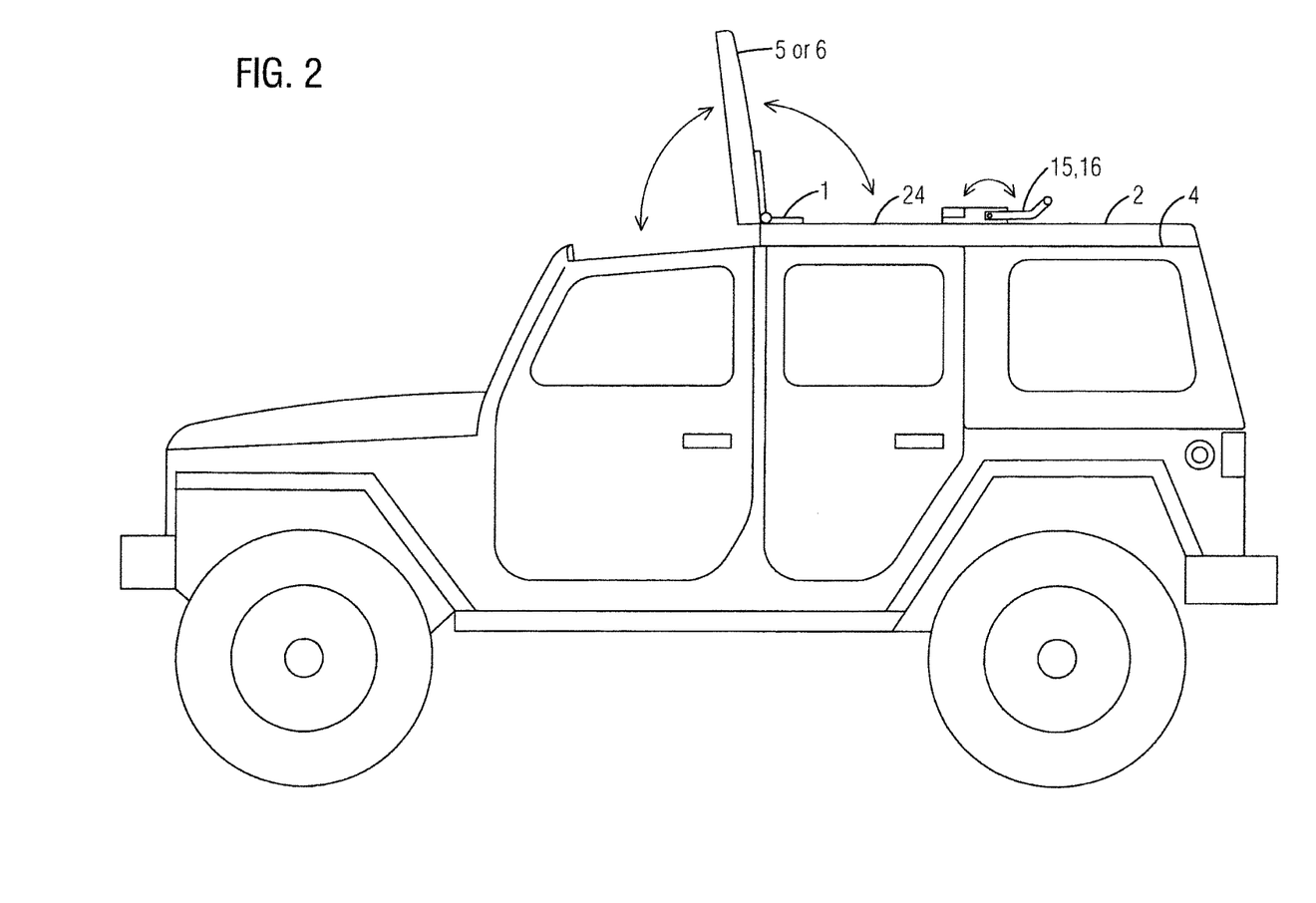
FIG. 2 is a side view of hinges of the present invention on a three-piece modular hardtop for a vehicle wherein the three-piece modular hardtop is in a partially open position.
Figure 3:
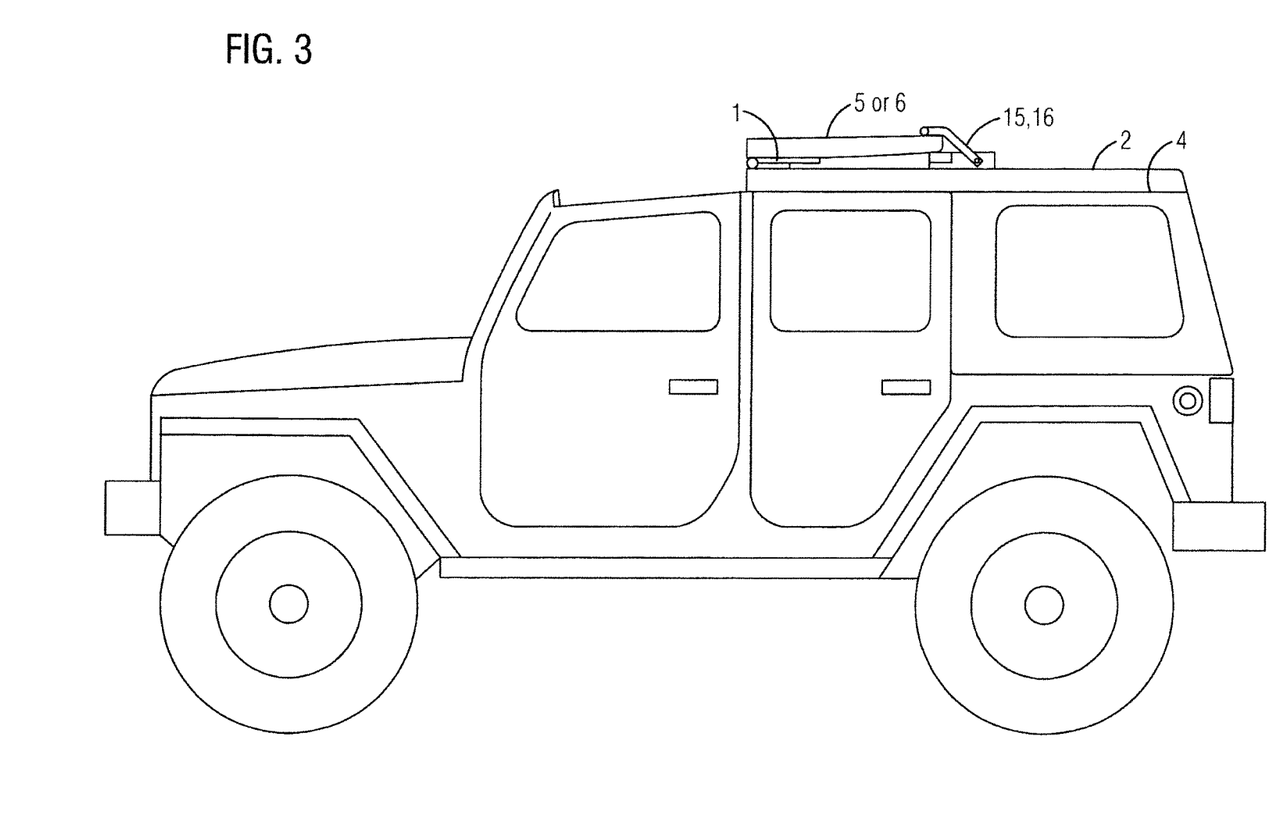
FIG. 3 is a side view of hinges of the present invention on a three-piece modular hardtop for a vehicle wherein the three-piece modular hardtop is in a fully open position.

With reference to FIGS. 2 and 3, side views of hinges 1 of the present invention on a three-piece modular hardtop 2 for a Vehicle wherein the three-piece modular hardtop 2 is in a partially open position and a fully open position, respectively, are illustrated. The hinges 1 of the present invention allow a user to fold the driver side roof panel 5 or passenger side roof panel 6 up and back over a fixed roof panel 14 of the base unit 4.

The hinges 1 may be capable of locking in a partially open position to prevent the driver side roof panel 5 and/or passenger side roof panel 6 from falling in either direction and slamming against other objects. The locking hinges 1 also aid those users who need to open the driver side roof panel 5 or passenger side roof panel 6 using a two-step process. For example, a shorter user may be required to partially raise the driver side roof panel 5 or passenger side roof panel 6 from inside the Vehicle, leave the driver side roof panel 5 or passenger side roof panel 6 in a locked partially raised position (as illustrated in FIG. 2), and then exit the Vehicle to finish folding the driver side roof panel 5 or passenger side roof panel 6 back onto the fixed roof panel 14 of the base unit 4 (as illustrated in FIG. 3). One or more locking means 15, such as a latch 16 and so forth, are preferably located on the fixed roof panel 14 of the base unit 4 to allow the driver side roof panel 5 and/or passenger side roof panel 6 to be locked in fully open positions for driving.

Figure 4:
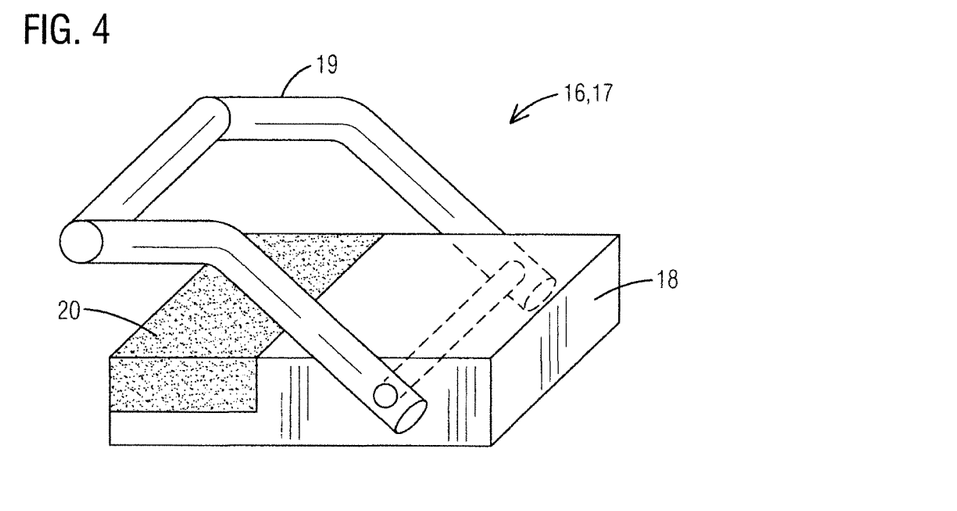
FIG. 4 is a top perspective view of a folding latch of the present invention.
Figure 5:
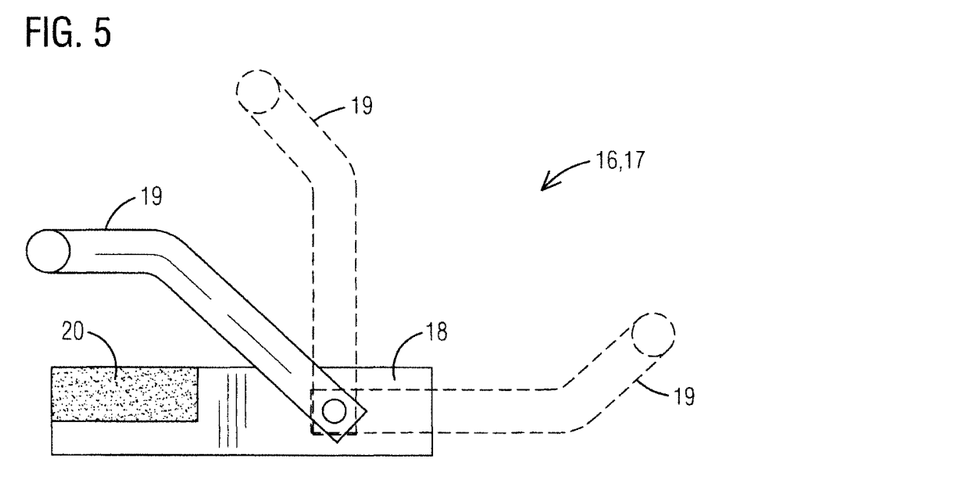
FIG. 5 is a side view of a folding latch of the present invention.

With reference to FIGS. 4 and 5, a top perspective view and a side view, respectively, of a folding latch 17 of the present invention are illustrated. The latch 16 of the present invention may be a folding latch 17 comprising a base 18 that is attached to the fixed roof panel 14 of the base unit 4 wherein an arm 19 is pivotally attached to the base 18 to allow the arm 19 to be placed over the driver side roof panel 5 or of the passenger side roof panel 6 when placed in a fully open position as illustrated in FIG. 3. A rubber pad 20 may be located on the base 18 to provide a soft surface for the driver side roof panel 5 or of the passenger side roof panel 6 to rest on when in fully open positions.

Figure 6:
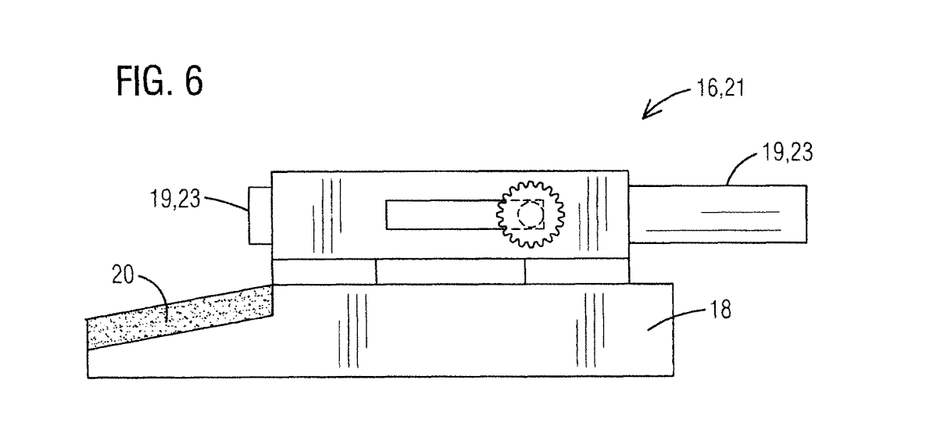
FIG. 6 is a side view of a sliding latch of the present invention in an open position.
Figure 7:
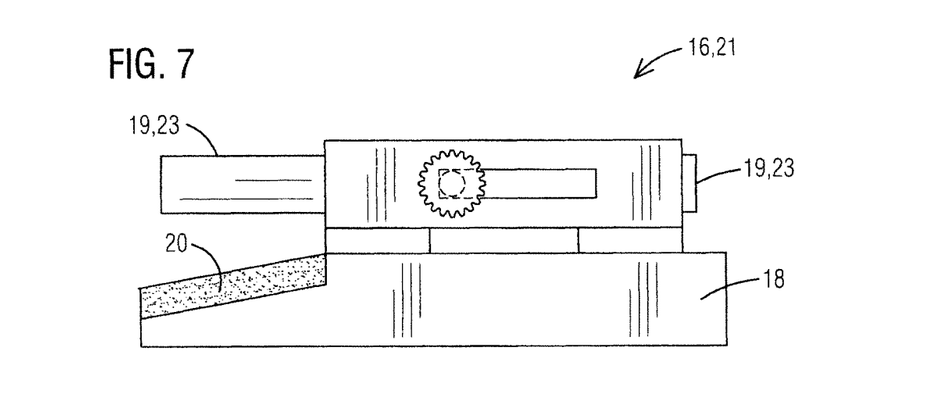
FIG. 7 is a top perspective view of a sliding latch of the present invention.

With reference to FIGS. 6 and 7, a side view and a top view, respectively, of a sliding latch 21 of the present invention in an open position and in a locked position, respectively, are illustrated. The latch 16 of the present invention may be a sliding latch 21 comprising a base 18 that is attached to the fixed roof panel 14 of the base unit 4 wherein an arm 19 or slide bolt retractably extends over an edge and/or a portion of the base 18 wherein a rubber pad 20 may be located to provide a soft surface for the driver side roof panel 5 or of the passenger side roof panel 6 to rest on when in fully open positions.

Figure 8:
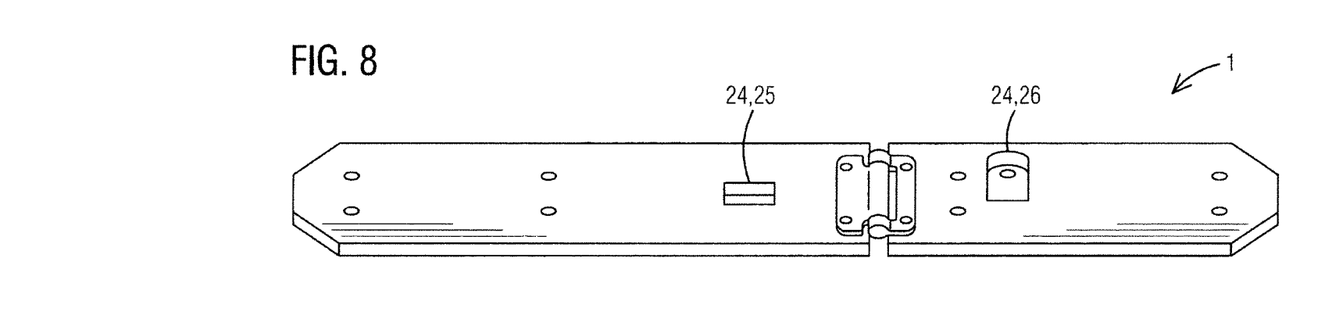
FIG. 8 is a top perspective view of a hinge of the present invention having a hasp integrated therein wherein the hinge is in an open position.

With reference to FIGS. 8 and 9, top perspective views of a hinge 1 of the present invention having a hasp 24 integrated therein wherein the hinge 1 is in an open position and in a folded and locked position, respectively, are illustrated. The hinge 1 comprises a hasp 24 having a slot 25 and corresponding loop 26 that engage each other when the hinge 1 is folded, thereby allowing the folded hinge 1 to be locked into position using a cotter pin 27 or equivalent means.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A hardtop for a sport utility vehicle comprising:
a base unit having a rear roof panel;
said rear roof panel having a front edge;
a driver side roof panel and a passenger side roof panel that cover a driver side seat and passenger side seat, respectively, of a sport utility vehicle when installed thereon;
said driver side roof panel having a rear edge that forms a seam with said front edge of said rear roof panel;

said passenger side roof panel having a rear edge that forms a seam with said front edge of said rear roof panel;
a hinge securing the driver side roof panel to the rear roof panel so that said driver side roof panel is capable of folding back onto said rear roof panel;
a second hinge securing the passenger side roof panel to the rear roof panel so that said passenger side roof panel is capable of folding back onto said rear roof panel independently of the driver side roof panel; and
said seam located between said driver side roof panel and said rear roof panel and said seam located between said passenger side roof panel and said rear roof panel form a single seam that is a curved seam.

* * * * *